United States Patent [19]

Ohgoda et al.

[11] Patent Number: 4,760,256
[45] Date of Patent: Jul. 26, 1988

[54] RADIATION IMAGE RECORDING AND READ-OUT APPARATUS

[75] Inventors: Makoto Ohgoda; Kaoru Tamura; Shumpeita Torii, all of Kanagawa, Japan

[73] Assignee: Fuji Photo Film Co., Ltd., Kanagawa, Japan

[21] Appl. No.: 739,593

[22] Filed: May 31, 1985

[30] Foreign Application Priority Data

Jun. 1, 1984 [JP] Japan ............................... 59-112380

[51] Int. Cl.⁴ .......................................... G01T 1/105
[52] U.S. Cl. .............................. 250/327.2; 250/484.1
[58] Field of Search ............... 250/484.1, 482.1, 483.1, 250/327.2

[56] References Cited

U.S. PATENT DOCUMENTS

| 4,439,682 | 3/1984 | Matsumoto et al. | 250/327.2 |
| 4,498,006 | 2/1985 | Horikawa et al. | 250/484.1 |
| 4,543,479 | 9/1985 | Kato | 250/327.2 |

FOREIGN PATENT DOCUMENTS

| 0077678 | 10/1982 | Japan | 250/327.2 |
| 0077676 | 10/1982 | Japan | 250/327.2 |
| 0094678 | 5/1983 | Japan | 250/327.2 |
| 0125800 | 4/1984 | Japan | 250/327.2 |

Primary Examiner—Janice A. Howell
Assistant Examiner—Richard Hanig
Attorney, Agent, or Firm—Sughrue, Mion, Zinn, Macpeak & Seas

[57] ABSTRACT

Stimulable phosphor sheets are circulated through an image recording section for recording radiation images on the stimulable phosphor sheets, an image read-out section for scanning the stimulable phosphor sheets by stimulating rays and detecting light emitted thereby upon stimulation, and an erasing section for releasing radiation energy remaining in the stimulable phosphor sheets. Time elapsed after the radiation energy remaining in each stimulable phosphor sheet was released is measured, and image recording on each stimulable phosphor sheet is detected. A time measurement signal and an image recording detection signal are sent to a control device which activates a sheet circulating and conveying system to send the stimulable phosphor sheet to the erasing section when the time elapsed after releasing of the radiation energy remaining in the stimulable phosphor sheet reaches a predetermined length prior to image recording on the stimulable phosphor sheet.

4 Claims, 2 Drawing Sheets

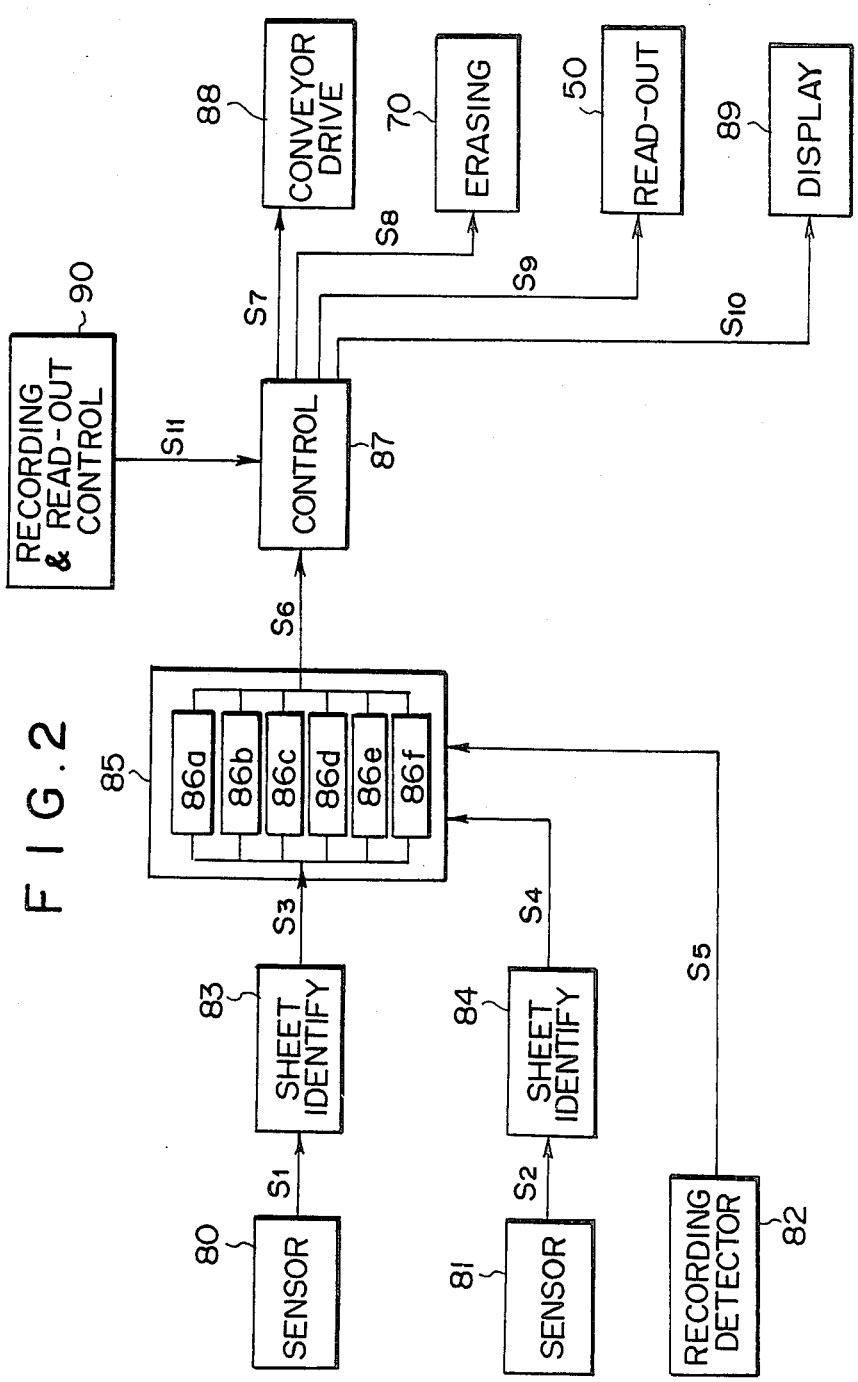

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to radiation passing through an object to have a radiation image of the object stored therein, exposing the stimulable phosphor sheet to stimulating rays which cause them to emit light in proportion to the stored radiation energy, and detecting and converting the emitted light into electric signals. This invention particularly relates to a radiation image recording and read-out apparatus in which the stimulable phosphor sheets are circulated and reused for recording radiation images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, with regard to a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load such a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, by storing the radiation images of the objects in the stimulable phosphor sheets, transferring the electric image signals read out from the stimulable phosphor sheets into a recording medium having a large storage capacity, such as a magnetic tape, and circulating and reusing the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

From the aforesaid viewpoint, the applicant proposed in Japanese Patent Application No. 58(1983)-66730 a built-in type radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, exposing said stimulable phosphor sheet to erasing light or heat to release the radiation energy remaining in said stimulable phosphor sheet, whereby said stimulable phosphor sheet is circulated through said image recording section, said image read-out section and said erasing section and reused for radiation image recording.

As described, for example, in Japanese Unexamined Patent Publication No. 56(1981)-12599 or U.S. Pat. No. 4,400,619, the radiation energy remaining in the stimulable phosphor sheet is released when the sheet is exposed to light or heat. However, after the residual radiation image is erased in this manner, a new residual image is generated as time elapses by radiation energy which has not been released completely. The stimulable phosphor sheet is also affected by environmental radiations such as cosmic rays and X-rays emitted by other X-ray sources and stores the energy thereof. These types of radiation energy (referred to as fog) undesirably stored in the stimulable phosphor sheet also cause noise to appear in the visible image reproduced from a reused stimulable phosphor sheet and, therefore, must be erased before reusing the stimulable phosphor sheet.

Therefore, in the aforesaid radiation image recording and read-out apparatus of Japanese Patent Application No. 58(1983)-66730, when a long time, e.g. several hours, has elapsed between erasing of a residual image in the stimulable phosphor sheet conducted at the erasing section after image read-out and the next radiation image recording on the sheet, it is necessary to circulate the sheet and pass the sheet through the erasing section and to conduct secondary erasing prior to the next image recording. As described, for example, in Japanese Unexamined Patent Publication No. 57(1982)-116300, the erasing time in the secondary erasing may be shorter than the erasing time in primary erasing conducted immediately after image read-out. However, it takes some time to circulate the sheet. In general, since it is not always possible to know how many hours have elapsed after the sheet which is to be used for image recording was subjected to erasing of the residual image in the radiation image recording and read-out apparatus, the secondary erasing has heretofore been conducted nearly always by circulating the sheet before the apparatus is used. This operation is troublesome and requires a long time.

SUMMARY OF THE INVENTION

The primary object of the present invention is to provide a radiation image recording and read-out apparatus which conducts radiation image recording and read-out by circulating the stimulable phosphor sheet and which is compact.

Another object of the present invention is to provide a radiation image recording and read-out apparatus in which secondary erasing need not be conducted each time the apparatus starts to be used.

The present invention provides a radiation image recording and read-out apparatus comprising:

(i) a circulating and conveying means for conveying at least one stimulable phosphor sheet for recording a radiation image therein along a predetermined circulation path, (ii) an image recording section positioned on said circulation path for recording a radiation image of an object in said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, (iv) an erasing section for, prior to the next image recording in said stimulable phosphor sheet for which the image read-out has been conducted at said image read-out section, exposing said stimulable phosphor sheet to erasing light or heat to release the radiation energy remaining in said stimulable phosphor sheet, (v) a time measurement means for measuring the time elapsed after radiation energy remaining in each stimulable phosphor sheet is released, (vi) an image recording detection means for detecting the image recording on each stimulable phosphor sheet, and (vii) a control means for receiving outputs of said time measurement means and said image recording detection means and activating said circulating and conveying means to send said stimulable phosphor sheet to said erasing section when said elapsed time of said stimulable phosphor sheet reaches a predetermined length prior to image recording on said stimulable phosphor sheet.

In the radiation image recording and read-out apparatus of the present invention, since the stimulable phosphor sheet is circulated through the image recording section, the image read-out section and the erasing section, it is possible to use the sheet repeatedly and to fabricate the apparatus compactly. This is very advantageous in practical use. Also, secondary erasing of the stimulable phosphor sheet is automatically conducted when necessary while the apparatus is not in use. Therefore, the stimulable phosphor sheet is readied for image recording at any time, and no work or time is needed for secondary erasing of the sheet when image recording is started.

When the circulating and conveying means is activated by the control means as in the case where secondary erasing is conducted by circulating the stimulable phosphor sheet when starting to use the apparatus in accordance with the conventional method, the image read-out section should preferably be adjusted to the non-operating condition, and the sheet should be passed through the image read-out section without exposure to stimulating rays, thereby decreasing the energy and time used.

The aforesaid predetermined time is adjusted to a value within the time from when primary erasing of the stimulable phosphor sheet is conducted to when secondary erasing of the sheet becomes necessary. When the sheet is automatically circulated and subjected to secondary erasing after the predetermined time, the sheet in the apparatus is always readied for image recording, and it becomes unnecessary to circulate the sheet each time the use of the apparatus is started, except for the special case where the timing of the automatic circulation of the sheet coincides with the apparatus use timing.

BRIEF DESCRIPTION OF THE DRAWINGS

FIG. 2 is a block diagram showing the electric circuit configuration for controlling the secondary erasing of the stimulable phosphor sheet in the embodiment of FIG. 1.

DESCRIPTION OF THE PREFERRED EMBODIMENTS

Figure 1:
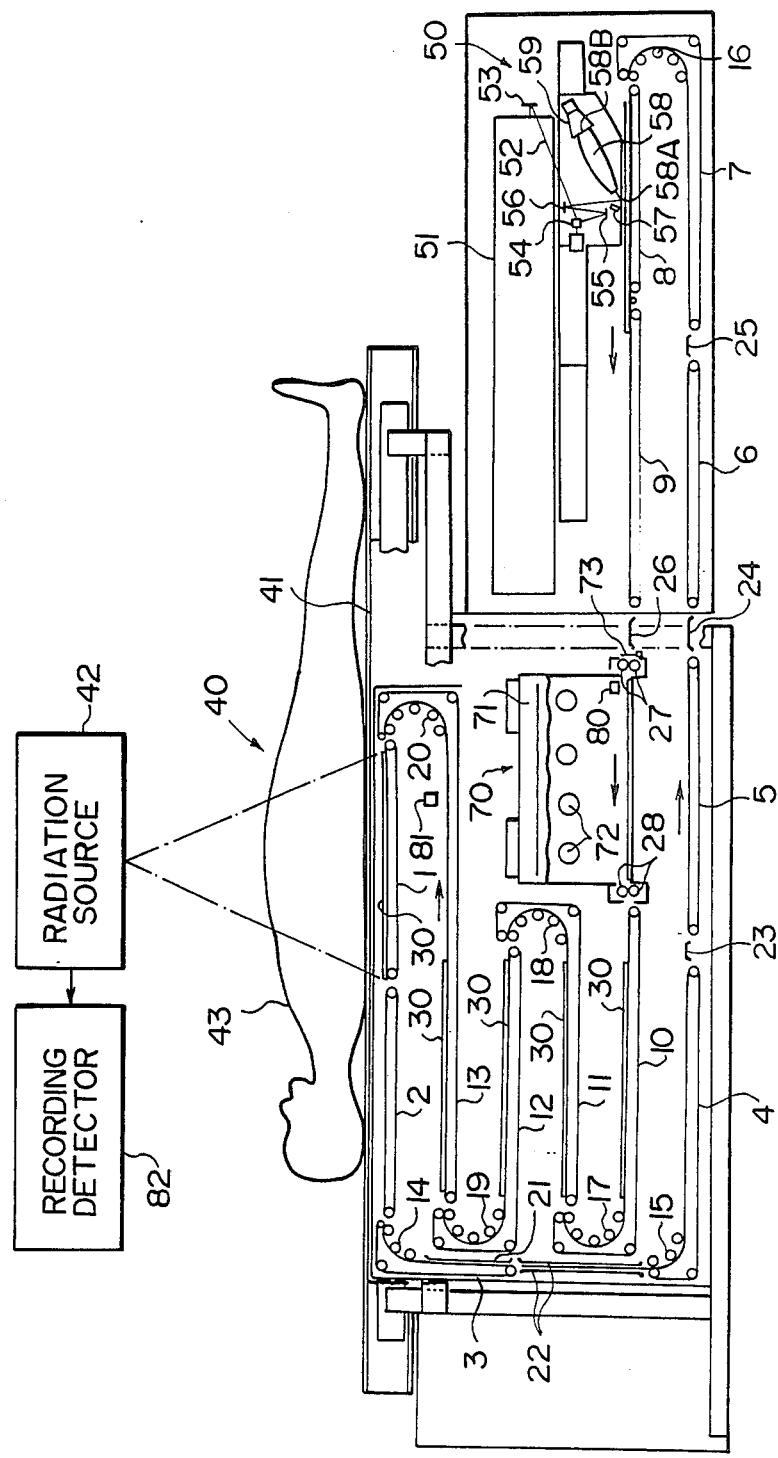
FIG. 1 is a schematic side view showing an embodiment of the radiation image recording and read-out apparatus in accordance with the present invention.

The present invention will hereinbelow be described in further detail with reference to the accompanying drawings.

FIG. 1 schematically shows an embodiment of the apparatus in accordance with the present invention, wherein a radiation image of the chest, abdomen or the like of a lying object is recorded. The apparatus is provided with a sheet circulation and conveyance system constituting a circulation path and comprising endless belts 1, 2, 3, 4, 5, 6, 7, 8, 9, 10, 11, 12 and 13, guide rollers 14, 15, 16, 17, 18, 19 and 20 rotated respectively by the endless belts 3, 4, 7, 10, 11, 12 and 13, guide plates 21, 22, 23, 24, 25 and 26, and nip rollers 27 and 28. In the sheet circulation and conveyance system, by way of example, six stimulable phosphor sheets 30 are conveyed and circulated in spaced relation to each other in the direction as indicated by the arrow.

Endless belts 1 and 2 are horizontally positioned at the top section of the circulation and conveyance system, and an image recording table 41 is positioned above the endless belts 1 and 2. A radiation source 42, e.g. an X-ray source, is spaced from the image recording table 41 to stand face to face with the endless belt 1. An image recording section 40 is constituted by the image recording table 41 and the radiation source 42. When a radiation image of an object 43 is recorded on the sheet 30, the sheet 30 is positioned on the endless belt 1, and the radiation source 42 is activated with the object 43 lying on the image recording table 41. In this manner, the sheet 30 is exposed to radiation passing through the object 43 to have a radiation image of the object 43 stored in the sheet 30.

An image read-out section 50 is positioned at the right end of the sheet circulation and conveyance system. At the image read-out section 50, a laser beam source 51 is positioned above the endless belt 8 constituting a part of the image read-out section 50, and a mirror 53, a galvanometer mirror 54, and mirrors 55, 56 are positioned for scanning a laser beam 52 emitted by the laser beam source 51 in the width direction of the sheet 30 placed on the endless belt 8. The galvanometer mirror 54 is swung in both directions to scan the laser beam 52 in the main scanning direction on the sheet 30 carrying the radiation image stored therein. The sheet 30 has been subjected to image recording at the image recording section 40 and then conveyed by the sheet circulation and conveyance system to the image read-out section 50. A light guiding reflection mirror 57 is positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet 30 directly towards a light guide member 58 and the light emitted thereby and reflected by the light guiding reflection mirror 57 enters the light guide member 58 from a light input face 58A thereof, and is guided inside of the light guide member 58 through total reflection to a light output face 58B thereof. The light is thus detected by a photomultiplier 59 connected to the light output face 58B of the light guide member 58. Simultaneously with the scanning of the sheet 30 by the laser beam 52 in the main scanning direction, the sheet 30 is moved by the endless belt 8 in the sub-scanning direction as indicated by the arrow approximately normal to the main scanning direction, so that the whole surface of the sheet 30 is scanned by the laser beam 52. An electric image signal obtained by the photomultiplier 59 is sent to an image processing circuit (not shown) for processing the electric image signal. The image signal thus processed is then sent to an image reproducing apparatus (not shown). The image reproducing apparatus may be a display device such as a CRT, or a device for recording a visible image by point-by-point scanning on a photographic film. Or, the image signal may be stored in a storage means such as a magnetic tape.

In general, the time taken for reading out a radiation image from one sheet 30 is longer than the time taken for recording the radiation image on the sheet 30. However, it is possible to quickly finish image recording on a plurality of the sheets 30 and maintain the exposed sheets 30 one by one, for example, on the endless belts 7, 6, 5, 4 and 2 prior to image read-out. Also, for example, Japanese Unexamined Patent Publication No. 58(1983)-89245 discloses a method wherein a read-out operation for detecting the image input information of a radiation image stored in a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain is adjusted and/or appropriate signal processing is conducted to obtain a visible image having an improved image quality, particularly a high diagnostic efficiency and accuracy regardless of radiation exposure conditions. In the apparatus of the present invention, too, it is possible to conduct the preliminary read-out and the final read-out by returning the sheet 30, which has been sent onto the endless belt 9 after image read-out, back to the image read-out position by reversely rotating the endless belts 7, 8 and 9.

After image read-out is finished, the sheet 30 is conveyed by the endless belt 9 to an erasing section 70 comprising a case 71 and many erasing light sources 72, e.g. fluorescent lamps, arranged within the case 71. After a shutter 73 is opened, the sheet 30 is conveyed by the endless belt 9 until the forward end of the sheet 30 contacts the nip rollers 27. The sheet 30 is thus sent into the case 71 by the rotating nip rollers 27. Then, the shutter 73 is closed, and the erasing light sources 72 are turned on. The erasing light sources 72 mainly emit light having a wavelength within the stimulation wavelength range for the stimulable phosphor constituting the sheet 30. When the sheet 30 is exposed to the erasing light, the radiation energy remaining in the sheet 30 after the image read-out is released. This primary erasing operation is conducted by exposing the sheet 30 to the erasing light for several tens of seconds. At this time, since the shutter 73 is closed, no noise is generated in the read-out signal by erasing light leaking into the image read-out section 50.

After the radiation energy remaining in the sheet 30 is erased to such an extent that the next image recording on the sheet 30 is possible, the nip rollers 28 are rotated and the sheet 30 is conveyed out of the erasing section 70. Then, the sheet 30 is conveyed by the endless belts 10, 11, 12 and 13 onto the endless belt 1 at the image recording section 40. At this time, if a different sheet 30 is present on the endless belt 1 at the image recording section 40, the sheet 30 conveyed by the endless belts 10, 11 and 12 is kept waiting on the endless belt 13, and subsequent sheets 30 are kept waiting on the endless belts 12, 11 and 10. When the image recording and read-out operations are finished, the last sheet 30 is subjected to erasing at the erasing section 70, moved back onto the endless belt 9 by reverse rotation of the nip rollers 27, and kept waiting on the endless belt 9.

As described above, the endless belts 1 to 13 and nip rollers 27 and 28 constituting the sheet circulation and conveyance system are controlled in relation to the image recording section 40, the image read-out section 50 and the erasing section 70 by a known sequence control method or the like, thereby conveying or keeping the sheets 30 waiting.

Each of six sheets 30 is provided with an optical identification mark (not shown) or the like at a position outside of the image recording region. Sensors 80 and 81 for detecting the identification mark are respectively positioned inside of the case 71 of the erasing section 70 and near the downstream end of the endless belt 13. Activation of the radiation source 42 is detected by a radiation source activation detector 82 acting as an image recording detecting means. As shown in FIG. 2, outputs S1 and S2 of the sensors 80 and 81 are sent respectively to sheet identification circuits 83 and 84. Sheet identification signals S3 and S4 generated by the sheet identification circuits 83 and 84 are sent to a timer circuit 85, and radiation source activation detecting signal S5 generated by the radiation source activation detector 82 is also sent to the timer circuit 85.

The timer circuit 85 comprises timers 86a, 86b, 86c, 86d, 86e and 86f corresponding to six sheets numbered, by way of example, as 30a, 30b, 30c, 30d, 30e and 30f. By way of example, the operation will be described with reference to the sheet 30a. When the sensor 80 and the sheet identification circuit 83 detects that the sheet 30a has passed through the erasing section 70, the timer 86a corresponding to the sheet 30a is set. (This also applies to the sheets 30b to 30f and timers 86b to 86f.) When a predetermined time (e.g. 1.5 hours) after which secondary erasing becomes necessary for making possible image recording elapses after the sheet 30a is subjected to primary erasing at the erasing section 70, the timer 86a sends a secondary erasing signal S6 to a control circuit 87. Upon receiving the secondary erasing signal S6, the control circuit 87 sends a drive signal S7 to a circulation and conveyance system drive circuit 88 for activating the endless belts 1 to 13 and the nip rollers 27 and 28. In this manner, the circulation and conveyance system is operated, and the sheet 30a placed on the endless belt 1 (the sheet 30 exhibiting the longest time elapsed after erasing is the one placed on the endless belt 1) is sent to the erasing section 70. Also, a turning-on signal S8 is sent from the control circuit 87 to the erasing section 70, and the erasing light source 72 is turned on. Since the secondary erasing can be achieved by use of an erasing light amount within the range of approximately 1/400 to 1/100 of the erasing light amount necessary for primary erasing, the secondary erasing is normally conducted by merely passing the sheet 30a through the erasing section 70 without maintaining the sheet 30a still therein. The other sheets 30b to 30f are moved one by one in the forward direction.

However, when image recording is conducted on the sheet 30a, i.e. the sheet exhibiting the longest time elapsed after erasing, placed on the endless belt 1 (i.e. when the radiation source 42 is activated) before the aforesaid predetermined time elapses, the radiation source activation detecting signal S5 is sent to the timer circuit 85 to reset the time measurement of the timer 86a. The timer 86a which is reset at this time is designated by the sheet identification signal S4 representing which sheet 30 is present on the endless belt 1. Since the time measurement of the timer 86a is reset in this manner, the sheet circulation and conveyance system is not operated for secondary erasing of the sheet 30a when the aforesaid predetermined time has elapsed while the sheet 30a is being subjected, for example, to image read-out. The timer 86a is set again when the sheet 30a is sent to the erasing section 70 and subjected to primary erasing after image recording and image read-out.

In this embodiment, when the drive signal S7 is output by the control circuit 87, an activation stop signal S9 is immediately input to the image read-out section 50, and the image read-out section 50 is not activated.

When the sheet circulation and conveyance system is driven by the drive signal S7, the endless belt 8 is rotated at an idling feed speed for merely conveying the sheet 30 regardless of the aforesaid scanning in the sub-scanning direction. Also, when the drive signal S7 is output from the control circuit 87, a display signal S10 is output at the same time to turn on a secondary erasing display means 89 positioned, for example, on a control panel of the apparatus and to indicate that secondary erasing is being conducted.

Regardless of the secondary erasing described above, an image recording and read-out control unit 90 for controlling the image recording and the image read-out in the apparatus outputs a hold signal S11 to the control circuit 87 as long as ordinary image recording and image read-out are carried out. In the case where the secondary erasing signal S6 is output from the timer 86a to the control circuit 87 while the hold signal S11 is input, outputs of the drive signal S7, the turning-on signal S8 and the activation stop signal S9 are held, and only the display signal S10 is output to indicate by the display means 89 that secondary erasing is necessary for the sheet 30 waiting for image recording on the endless belt 1. When the steps from image read-out to residual image erasing (primary erasing) are finished, output of the hold signal S11 is stopped, and the drive signal S7, the turning-on signal S8 and the activation stop signal S9 are output to conduct secondary erasing.

The means for automatically conducting the secondary erasing as described above should preferably be driven by use of a backup power source in the case of an electric power failure. Or, the apparatus should be fabricated so that at least the timer circuit 85, the control circuit 87 and the display means 89 are operable by use of a backup power source in the case of an electric power failure, and secondary erasing is conducted manually by use of the restored power supply when the display means 89 remains on.

Also, in the aforesaid embodiment, the sheet 30 is sent to the erasing section 70 and, at the same time, the erasing section 70 is operated when the predetermined time requiring the secondary erasing has elapsed. However, it is also possible to maintain the erasing section 70 in the operating condition and not to control the erasing section 70 in accordance with the aforesaid predetermined time.

We claim:

1. A radiation image recording and read-out apparatus comprising:
  (i) a circulating and conveying means for conveying at least first and second stimulable phosphor sheets for recording a radiation image therein along a predetermined circulation path.
  (ii) an image recording section positioned on said circulation path for recording a radiation image of an object in one of said sheets by exposing said one sheet with said one sheet in an image recording position to radiation passing through said object,
  (iii) an image read-out section positioned on said circulation path downstream of said image recording section and provided with a stimulating ray source for emitting stimulating rays for scanning said one sheet carrying said radiation image stored therein, and a photoelectric read-out means for detecting light emitted by said one sheet scanned by said stimulating rays to obtain an electric image signal,
  (iv) an erasing section, positioned on said circulation path downstream of said image read-out section, for, prior to the next image recording in said one sheet for which the image read-out has been conducted at said image read-out section, exposing said one sheet to erasing light or heat to release the radiation energy remaining in said one sheet, (v) a time measurement means for measuring the time elapsed after radiation energy remaining in said one sheet is released, (vi) an image recording detection means for detecting the image recording on said one sheet, and (vii) a control means for receiving outputs of said time measurement means and said image recording detection means and activating said circulating and conveying means to send said one sheet to said erasing section and the other of said sheets to said image recording position when said elapsed time of said stimulable phosphor sheet reaches a first predetermined length of time prior to image recording on said one sheet, wherein said control means sets said image read-out section in the non-operating condition when said circulating and conveying means is activated, and said first predetermined length of time is less than a second length of time after image recording on said one sheet, at which second length of time the level of noise in said electric image signal obtained by said image recording section from said one sheet would be unacceptable, whereby said one of said first and second sheets at said image recording section is always ready for image recording with an acceptable level of noise.

2. An apparatus as defined in claim 1 wherein said stimulable phosphor sheet is provided with an identification mark, and sensors for detecting said identification mark are positioned respectively at said circulating and conveying means in the vicinity of the upstream end of said image recording section and at said erasing section, said sensors being connected to said time measurement means via stimulable phosphor sheet identifying circuits.

3. An apparatus as defined in claim 1 wherein said image recording detection means is connected to a radiation source for emitting said radiation so as to detect activation of said radiation source.

4. An apparatus as defined in claim 1 wherein said circulating and conveying means comprises endless belts and rollers.

* * * * *